March 16, 1954 J. M. CALDWELL 2,672,155
LIQUID LEVEL INDICATING, RECORDING, AND CONTROLLING APPARATUS
Filed May 21, 1946 2 Sheets-Sheet 1

INVENTOR
JOSEPH MORTON CALDWELL
BY
ATTORNEY

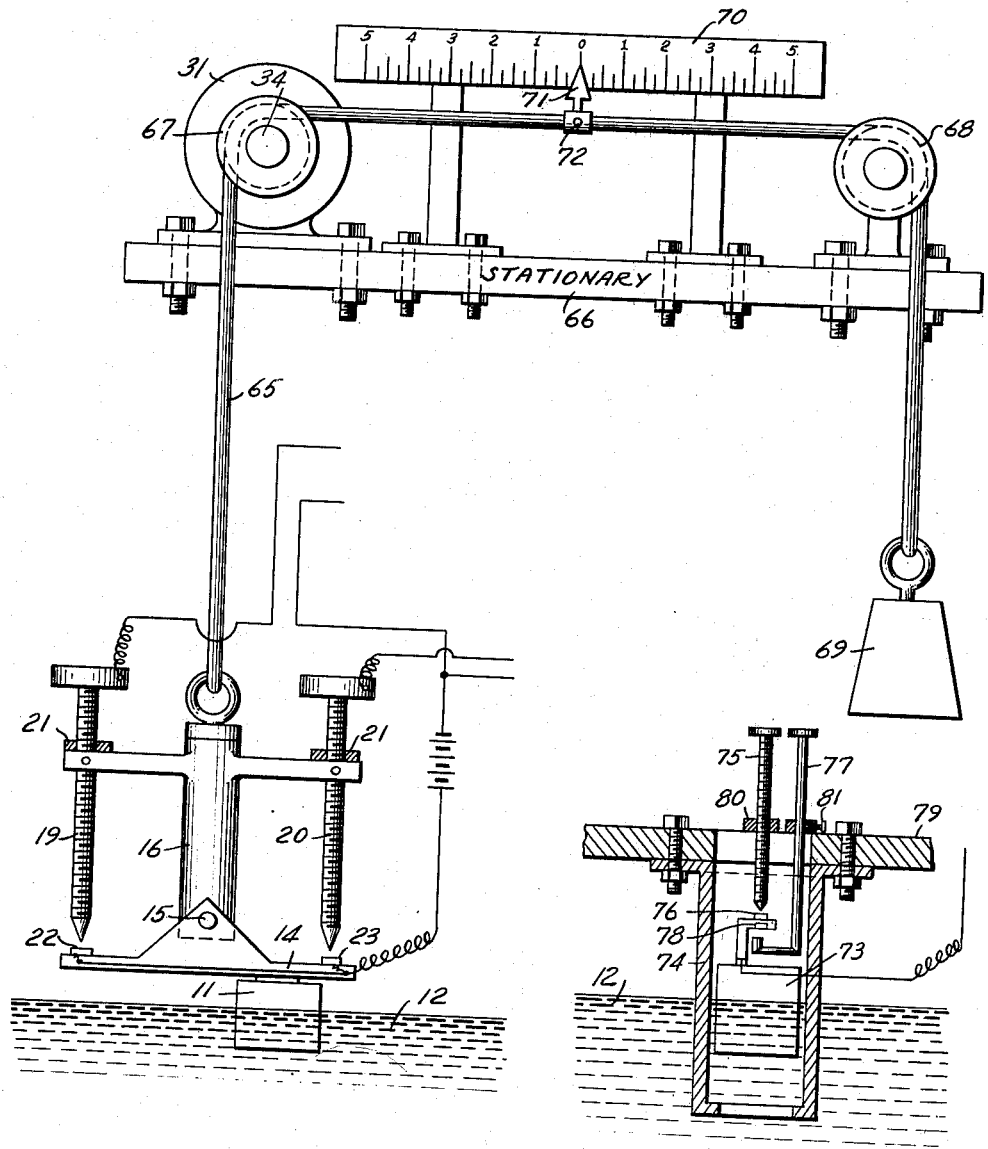

Patented Mar. 16, 1954

2,672,155

UNITED STATES PATENT OFFICE 2,672,155

LIQUID LEVEL INDICATING, RECORDING, AND CONTROLLING APPARATUS

Joseph M. Caldwell, Arlington, Va.

Application May 21, 1946, Serial No. 671,379

11 Claims. (Cl. 137—412)

This invention relates to an improved apparatus for indicating, recording and controlling the level of liquids and more particularly to an electrically actuated float suspension device designed to indicate, record, and control the fluctuation of the level of the surface of a body of liquid with a high degree of accuracy over a wide range of variation.

Heretofore apparatus used to indicate the level of liquids generally have been designed around a mechanical float member linked by direct mechanical means to level indicating, controlling and recording means. This linkage arrangement relies solely upon the motion of the float in response to the movement of the level of the surface of the liquid to actuate the mechanism and its fluctuations vary directly with the buoyancy of the float and its relation to the liquid level. The power needed to operate the device and to overcome the inherent friction in a mechanism of this type has made it necessary to use extremely large floats thereby sacrificing the obvious advantages gained by the use of a float unit of smaller horizontal cross-section. The conventional type float unit with direct reading indication has been found unsatisfactory for measurements wherein extreme accuracy is imperative. Moreover, these larger float units cannot be used in installations where the space is restricted because of surrounding structure or where the quantity of water available to move the float is very limited.

An object of the invention is to overcome the disadvantages enumerated above and to provide a simple and inexpensive device which will enable liquid levels to be indicated, recorded or controlled with a high degree of accuracy.

Another object of the invention is to provide a liquid level indicating, recording and controlling device which will enable a float of relatively small horizontal cross section to be used without sacrificing accuracy.

A further object of the invention is to provide a float actuated liquid level indicating, controlling and recording device which does not rely on the force from the float being out of equilibrium to move the supporting member and members connected with the indicating, recording and controlling means.

A still further object of the invention is to provide a float actuated liquid level indicating, controlling and recording device which may have its float unit located some distance from the indicating, recording and controlling means and at the same time not sacrifice accuracy.

An additional object resides in the provision of an improved method for indicating changes in the surface level of a body of liquid and for recording such changes and in controlling the factors involved in such changes when desired.

The arrangement of the device is such that the float itself is used only to give an indication that the liquid level has changed and to give the direction of that change. The connections to an electric motivating means are such that once the float has indicated a change in level, it will determine the degree of change in liquid level by moving the float assembly either in an upward direction or in a downward direction in proportion to the change in liquid level to maintain the float assembly at a substantially constant position relative to the surface of the liquid. By combining an indicator, a recorder or a control valve of the desired design with the float suspension member, the level of the liquid may be very accurately indicated, recorded or controlled. The power which moves the suspension member and the indicating, recording and controlling means is furnished by an electric motor and not by the buoyancy of the float as is the case in most conventional apparatus of this type.

One application of the invention is to indicate and record the liquid level in small-scale hydraulic model studies, wherein the amount of water to actuate the float is small and the changes in the levels are of relatively small magnitude.

Further objects and advantages of the invention will be apparent from the following description taken in conjunction with the drawings, wherein:

Fig. 2 is a diagrammatic elevational view of a modified form of the apparatus shown in Fig. 1; and Fig. 3 is a sectional view showing a modified form of float responsive to changes in the level of the liquid surface.

Figure 1:
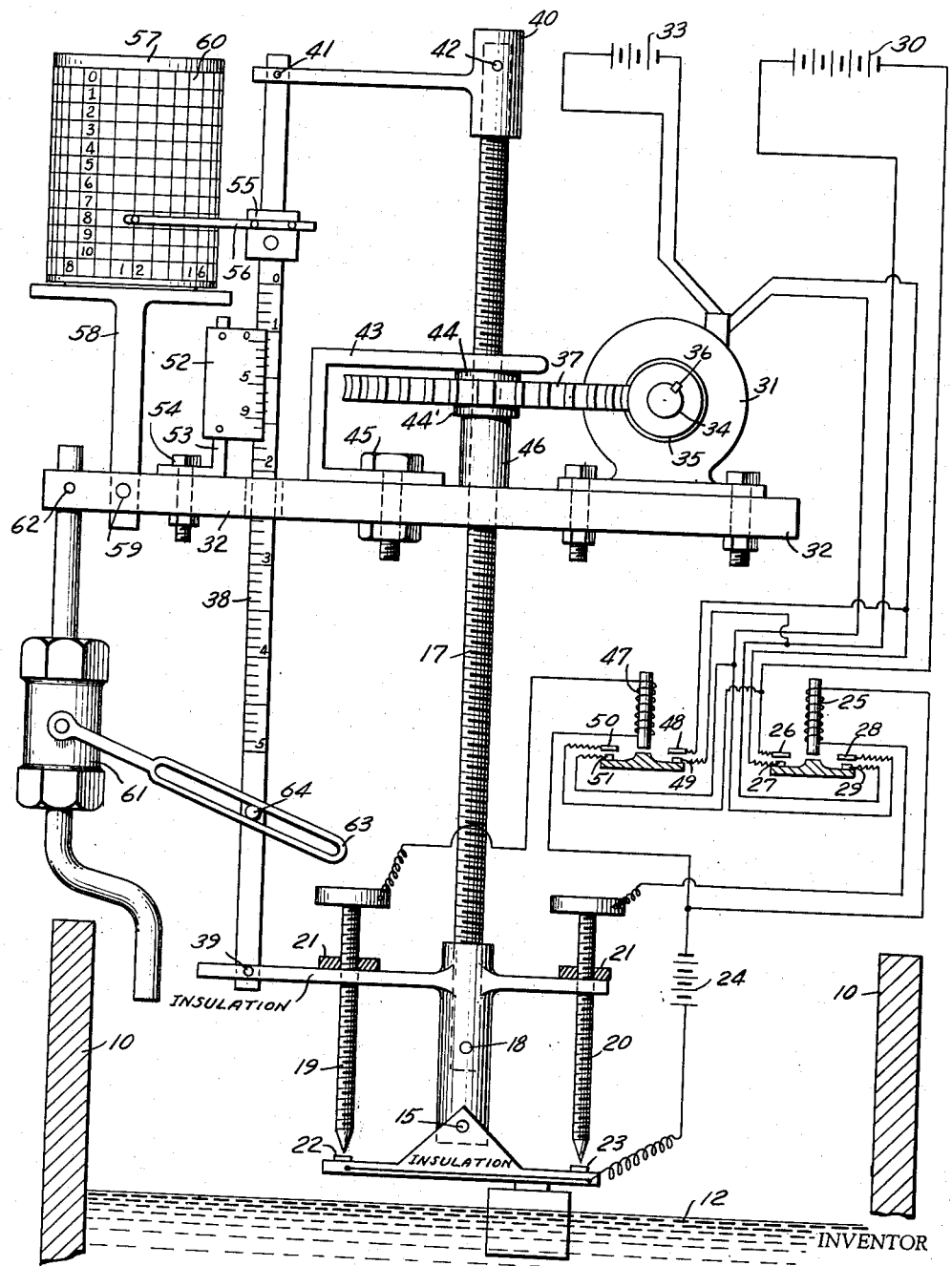
Fig. 1 is a diagrammatic elevational view of a liquid level indicating device illustrative of the invention with liquid level recording and controlling means shown operatively included therein.

With continued reference to the drawings and more particularly to Fig. 1, the apparatus is illustrated in a functioning position in a container 10. The float 11, resting in liquid 12 is attached by shaft 13 to rocker arm 14. The rocker arm is constructed of a stiff, dielectric material and is pivoted to turn freely on and about pin 15 which is fixed into the foot assembly 16. The foot assembly is also made of dielectric material and is secured upon the threaded end of shaft 17 and held rigidly fixed thereto by pin 18. Shaft 17 constitutes a support for the float assembly and the elements associated therewith. The actual movement of rocker arm 14 around pin 15 is restrained to a small magnitude by contact screws 19 and 20 which are firmly screwed into the foot assembly 16 as shown. The contact screws are locked into position by lock nuts 21. When the float 11 and rocker arm 14 are in a state of stable equilibrium while floating freely in the liquid there is a slight clearance between the contact screw 19 and contact plate 22 on the rocker arm and between screw 20 and contact plate 23 also on the rocker arm. A slight rise in the liquid level will raise the elevation of the float and the rocker arm thereby bringing contact plate 23 into contact with contact screw 20.

This contact between the plate and the screw closes an electrical circuit through electrical source 24 and electrical relay 25. The exciting of relay 25 closes a circuit through contact points 26, 27, 28 and 29, electrical source 30 and the armature of motor 31 mounted on stationary platform 32. The field of motor 31 is excited constantly by electrical source 33; thus the closing of the armature circuit by the action of relay 25 causes the motor shaft 34 to rotate. The movement of the motor shaft rotates the mechanical worm 35 which is fixed to the motor shaft 34 by key 36. The worm 35 coacts with worm wheel 37 thereby transmitting its motion to the said wheel. The center portion of worm wheel 37 is threaded on shaft 17.

Shaft 17 is prevented from rotating with the worm wheel by staff rod 38 which passes through a hole in platform 32 and is fixed to the upper cross member of foot assembly 16 by pin 39 and to the top assembly 40 by pin 41. Top assembly 40 is fixed to the shaft 17 by being screwed thereon and pinned thereto by pin 42. Worm wheel 37 is prevented from moving in an upward direction on the shaft 17 by clamp 43 and bearing washer 44. Clamp 43 is in turn fixed to platform 32 by bolt 45. Worm wheel 37 is also prevented from moving in a downward direction on the shaft by sleeve 46 and bearing washer 44'. As a result of the above-described restraint of shaft 17 and worm wheel 37, the rotation of the worm wheel forces the shaft 17 to move either upwardly or downwardly depending on the direction of rotation of the worm wheel. The wiring of motor 31 is so arranged that when relay 25 is closed the shaft 17 is raised by the rotation of the motor shaft 34. The rising of shaft 17 in turn raises the foot assembly 16 and causes the contact screw 20 to separate from contact plate 23. This separation of the screw and plate breaks the circuit to relay 25 which in turn breaks the circuit to the armature of motor 31 thereby bringing the motor to a halt and stopping the rise of shaft 17.

If the liquid level falls from the equilibrium position, the rocker arm will move in a clockwise direction until contact screw 19 is brought in contact with contact plate 22. This action closes relay 47 and thereby contact points 48, 49, 50, and 51 which in turn close the circuit to the armature of motor 31. The direction of current to the armature, however, is reversed from that experienced by the closing of relay 25; thus the direction of rotation of the motor and worm wheel is also reversed and the shaft 17 is forced downwardly. This downward movement of shaft 17 in turn causes the rocker arm 14 to rotate in a counterclockwise direction sufficiently to break the contact between contact screw 19 and contact plate 22. This deactivates relay 47 and brings the motor to a halt.

The action described above causes the vertical movement of the shaft 17 to reflect with a very high degree of accuracy the vertical movement of the level of the liquid 12, for as the liquid level changes the float is moved so that contact is made by one of the rocker arm contact plates and its companion contact screw. This contact in turn starts the motor in such a way as to restore the relative position of the liquid level, the float 11, the rocker arm 14, and the shaft 17 to their equilibrium position, and maintain the float assembly at a substantially constant position relative to the surface of the liquid.

Since staff rod 38 is fixed to shaft 17 by pins 39 and 41 and assemblies 16 and 40, the vertical movement of the staff rod reflects with a very high degree of accuracy the movements of the level of liquid 12. By engraving a scale onto staff rod 38 and bringing it into index with a reference mark or vernier 52 fixed to platform 32 by support 53 and bolt 54 the rise and fall of the liquid level with reference to the platform 32 is indicated by reading the vernier.

By attaching a pen arm assembly 55 to the staff rod 38 and bringing the pen 56 against a conventional clock-driven recording drum 57 supported on table 58 fixed to platform 32 by pin 59, the rise and fall of the liquid level is recorded on a chart 60 mounted on the drum, thereby making a permanent record of the fluctuations of the liquid level with time.

Through the use of a commercial type valve 61 the supply of liquid flowing into container 10 may be replenished thereby controlling the level of such liquid with a high degree of accuracy. The valve is mounted on platform 32 and fixed thereto by pin 62. The opening and closing of the valve is accomplished by movement of the valve handle 63 reflected from the motion of staff rod 38. The valve handle is attached thereto by sliding pin 64. When the liquid has reached the desired level the valve will be in a closed position and will remain there until the float assembly 16 has moved in a downward direction.

By connecting the float 11 to the rocker arm 14 at a point between the pin 15 and the contact point 23 the motion of the float is amplified at the contact point and produces a better breaking and making of the electrical contact.

Fig. 2 is an application of the invention wherein a chain or analogous flexible member 65 is used in lieu of the threaded shaft, being secured at its lower end to the assembly 16. In this application the float unit and electrical connections are precisely as described above in connection with Fig. 1, and hence the connections are not fully shown.

The motor 31 is mounted on a stationary platform 66 and has a pulley wheel 67 fixed to the motor shaft over which the chain or analogous flexible member 65 passes to a second pulley wheel 68. The weight of the float unit assembly 16 is supported by pulley wheels 67, 68 and is balanced by a counterweight 69 secured to the end of the flexible member. The rise and fall of the level of the liquid 12 is indicated on the scale 70 (supported on platform 66) by movement of the pointer 71 which is adjustably fastened to the chain 65 by set screw 72. Through the use of this application of the invention the float unit may be located quite a distance from the indicating means without sacrificing accuracy. A recording drum 57, vernier 52 or a control valve 61 as described in connection with Fig. 1 may also be mounted on platform 66 if desired.

Although change in the level of the liquid may be reflected by the float 11 mounted on shaft 13 to rocker arm 14, the same results may be accomplished by the use of a free moving float unit as shown in Fig. 3.

In this modification the float 73 is confined in an open ended hollow float chamber assembly 74 which is partly immersed in the liquid so as to allow the float to move in upward or downward directions only. Thus when the level of the liquid 12 changes the float will move, bringing into contact screw 75 and contact point 76 or pin 77 and contact point 78 depending upon the direction of the movement of the surface of the liquid. The closing of the electrical circuit by this contact activates the motor in the same manner as was described in connection with Fig. 1, thereby causing the foot assembly 79 supporting said hollow float chamber to rise or fall until equilibrium has been reached, at which time the contact will be broken. The contact screw 75 may be very accurately set with the desired clearance and locked in position by lock nut 80. Contact pin 77 is likewise set in position and there locked by means of a set screw 81.

It can be seen that the described embodiments of the invention will indicate and record the liquid level constantly within the limit of clearance set between the contact screws and their respective contact plates. As this clearance can be set to very small values the error in the indication of the liquid level will at all times be very slight. This feature is not found in the usual type of float operated indicator for they usually rely on the float to drive the indicating and recording members. This results in a tendency for the float to move by jumps for the static friction of the various guides and the recording pen restrain the float, until there has been a considerable displacement from the equilibrium position when it suddenly moves to its new equilibrium position. In an attempt to overcome this feature, the floats are sometimes made very large in order to provide additional force to overcome the static friction in the guides and the recording pen. Such large floats are often undesirable as they take up considerable space and require quite a quantity of water to displace them. These undesirable features are eliminated in my invention as the float does not operate the recording pen and move the guide rods. The float 11 is of sufficient size only to move the rocker arm 14 and thereby make the appropriate electrical contact. The motor 31 does the remainder of the work of lifting or lowering the shafts, guide rods, recording pen and controlling valve.

It will be obvious to those skilled in the art that various changes may be made in the embodiments of the invention without departing from the spirit and scope of the invention and therefore the invention is not limited by that which is shown in the drawings and described in the specification but only as indicated in the appended claims.

What is claimed is:

1. Apparatus responsive to changes in the level of the upper surface of a body of liquid, comprising a movable support, electromotive means operatively connected with said support to raise and lower it, a cross member secured to the lower end of said support, adjustable, spaced apart contact screws carried by said cross member and insulated therefrom, a rocker arm pivotally supported intermediate its length between said adjustable contact screws, contact plates on said rocker arm, a float secured to said rocker arm operative to tilt said rocker arm to move said contact plates into contact with their respective contact screws as the level of said liquid rises or falls, and means including relay reversing switches operatively connected between said contact screws and said electromotive means to control said electromotive means in a manner to cause said float and said movable support to follow changes in the level of said liquid.

2. Apparatus for indicating the position of the upper surface of a body of liquid, comprising a vertically movable support, a pair of electrical contacts carried by said support at its lower end, electromotive means controlled by said contacts, and operatively connected to said support to impart vertical movements thereto, a float of size only sufficient to operate said contacts pivotally secured to the lower end of said support and operatively connected to said contacts to control said electromotive means in a manner to maintain said float at a substantially constant position relative to the upper surface of said fluid, and fluid level indicating means operatively associated with said support.

3. Apparatus responsive to changes in the level of the upper surface of a body of liquid, comprising a vertically movable support, electromotive means operatively connected with said support to impart a vertical movement thereto, a pair of electrical contacts carried by said support and adjustable relative thereto, electromotive means controlled by said contacts and operatively connected to said movable support to impart vertical movement to said movable support, a float movably mounted on said movable support and operatively connected to said contacts on said movable support to control said electromotive means in a manner to maintain said float at a substantially constant lever relative to said upper surface of said liquid, and means including electrical means operatively connected between said adjustable contacts and said electromotive means to control said electromotive means in a manner to cause said float and said support to follow changes in the level of said liquid.

4. Apparatus for indicating and recording the position of the upper free surface of a body of liquid in a reservoir and for maintaining a predetermined level comprising a stationary support mounted above said body of liquid, an elongated member mounted for vertical movement relative to said support, power-operated means mounted on said support and operative to raise and lower said member, a float assembly mounted on the lower end of said member and adapted to be partially immersed in said liquid, means included in said float assembly for controlling said power operated means to maintain said assembly at a substantially constant position relative to said surface of the liquid, a substantially vertical rod connected to said member and movable therewith, graduated scale markings on said rod, a vernier attached to said support and cooperating with said scale to indicate the liquid level in said reservoir, a recorder mounted on said support, a pen attached to said rod and cooperating with said recorder for recording the liquid level in said reservoir, means for supplying liquid to said body of liquid, a valve in said supply means, and a control lever on said valve operably connected to said rod for maintaining the level of liquid in said reservoir substantially constant.

5. Apparatus for indicating and recording the position of the upper free surface of a body of liquid in a reservoir and maintaining a predetermined level comprising a stationary support mounted above said body of liquid, an elongated member mounted for vertical movement relative to said support, power-operated means mounted on said support and operative to raise and lower said member, a float assembly mounted on the lower end of said member and adapted to be partially immersed in said liquid, said float assembly comprising a pair of adjustable contacts and a rocker arm pivoted intermediate its length between said contacts, said rocker arm having a pair of contacts and a float associated therewith for operating said contacts and controlling said power-operated means to maintain said assembly at a substantially constant position relative to said surface of the liquid, a substantially vertical rod connected to said member and movable therewith, graduated scale markings on said rod, vernier attached to said support and cooperating with said scale to indicate the liquid level in said reservoir, a recorder mounted on said support, a pen attached to said rod and cooperating with said recorder for recording the liquid level in said reservoir, means for supplying liquid to said body of liquid, a valve in said supply means, and a control lever on said valve operably connected to said rod for maintaining the level of liquid in said reservoir substantially constant.

6. Apparatus for indicating and recording the position of the upper free surface of a body of liquid in a reservoir and maintaining a predetermined level comprising a stationary support mounted above said body of liquid, an elongated member mounted for vertical movement relative to said support, power-operated means mounted on said support and operative to raise and lower said member, a float assembly mounted on the lower end of said member and adapted to be partially immersed in said liquid, means included in said float assembly for controlling said power operated means to maintain said assembly at a substantially constant position relative to said surface of the liquid, a substantially vertical rod connected to said member and movable therewith, graduated scale markings on said rod, a vernier attached to said support and cooperating with said scale to indicate the liquid level in said reservoir, a recorder mounted on said support, a pen attached to said rod and cooperating with said recorder for recording the liquid level in said reservoir, means for supplying liquid to said body of liquid, a valve in said supply means, and a control lever on said valve operably connected to said rod for maintaining the level of liquid in said reservoir substantially constant.

7. Apparatus for indicating the position of the upper free surface of a body of liquid in a reservoir and maintaining a predetermined level comprising a stationary support mounted above said body of liquid, an elongated member mounted for vertical movement relative to said support, power-operated means mounted on said support and operative to raise and lower said member, a float assembly mounted on the lower end of said member and adapted to be partially immersed in said liquid, means included in said float assembly for controlling said power-operated means to maintain said assembly at a substantially constant position relative to said surface of the liquid, a substantially vertical rod connected to said member and movable therewith, graduated scale markings on said rod, a vernier attached to said support and cooperating with said scale to indicate the liquid level in said reservoir, means for supplying liquid to said body of liquid, a valve in said supply means, and a control lever on said valve operably connected to said rod for maintaining the level of liquid in said reservoir substantially constant.

8. Apparatus for indicating the position of the upper free surface of a body of liquid in a reservoir and maintaining a predetermined level comprising a stationary support mounted above said body of liquid, an elongated member mounted for vertical movement relative to said support, power-operated means mounted on said support and operative to raise and lower said member, a float assembly mounted on the lower end of said member and adapted to be partially immersed in said liquid, means included in said float assembly for controlling said power-operated means to maintain said assembly at a substantially constant position relative to said surface of the liquid, a substantially vertical rod connected to said member and movable therewith, means for supplying liquid to said body of liquid, a valve in said supply means, and a control lever on said valve operably connected to said rod for maintaining the level of liquid in said reservoir substantially constant.

9. Apparatus responsive to changes in the level of the upper surface of a body of liquid, comprising a vertically movable support, electromotive means operatively connected with said support to impart a vertical movement thereto, an open end hollow member secured to the lower end of said support, a float in said hollow member having a limited vertical movement relative thereto, a pair of vertically spaced adjustable contacts in said hollow member, a contact on said float disposed between said adjustable contacts and movable into contact with one or the other of said adjustable supports as the liquid level rises or falls, and means including relay switches operatively connected between said adjustable contacts and said electromotive means to control said electromotive means in a manner to cause said float and said support to follow changes in the level of said liquid.

10. Apparatus responsive to changes in the level of the upper surface of a body of liquid, comprising an elongated flexible member, means supporting said flexible member intermediate its length, electromotive means drivingly connected to said supporting means to impart lineal movement to said flexible member, a float assembly comprising a movable float and a pair of spaced electrical contacts operated alternatively by said float secured to one end of said flexible member and adjustable relative thereto, a counter-weight secured to the opposite end of said flexible member, and means interconnecting said contacts and said electromotive means to control said electromotive means in a manner to cause said float and flexible member to follow changes in the level of the upper surface of said body of liquid.

11. Apparatus responsive to changes in the level of the upper surface of a body of liquid, comprising a vertically movable support, electromotive means operatively connected with said support to raise and lower it, a cross member secured to the lower end of said support, adjustable spaced apart contact screws carried by said cross members and insulated therefrom, a rocker arm pivotally supported intermediate its length between said adjustable contact screws, contact plates on said arm, a float secured to said arm operative to tilt said arm to move said plates into contact with their respective companion adjustable contact screws as the level of said liquid rises or falls, said float being positioned on said rocker arm in such a manner as to amplify the float induced movement in the making and breaking of said contact, and means to control said electromotive means in a manner to cause said float and said movable support to follow changes in the level of said liquid.

JOSEPH M. CALDWELL.

References Cited in the file of this patent
UNITED STATES PATENTS

| Number | Name | Date |
|---|---|---|
| 1,406,377 | Harvey | Feb. 14, 1922 |
| 1,664,265 | Reiber | Mar. 27, 1923 |
| 1,695,701 | Steiner | Dec. 18, 1928 |
| 1,954,142 | Moffett | Apr. 10, 1934 |
| 2,015,967 | Ryder | Oct. 1, 1935 |
| 2,056,287 | Manley | Oct. 6, 1936 |
| 2,203,472 | Schmidt | June 4, 1940 |
| 2,394,220 | Wagner | Feb. 5, 1946 |
| 2,426,930 | Hicks | Sept. 2, 1947 |
| 2,520,797 | Buss et al. | Aug. 29, 1950 |

FOREIGN PATENTS

| Number | Country | Date |
|---|---|---|
| 409,102 | Great Britain | Apr. 26, 1934 |